United States Patent [19]

De Kock

[11] 4,232,767

[45] Nov. 11, 1980

[54] ARRANGEMENT FOR ADJUSTING THE DAMPING FORCE OF A SHOCK ABSORBER

[75] Inventor: Cornelis De Kock, Oud-Beijerland, Netherlands

[73] Assignee: ITT Industries, Inc., New York, N.Y.

[21] Appl. No.: 972,908

[22] Filed: Dec. 26, 1978

[51] Int. Cl.$^3$ .............................................. F16F 9/34
[52] U.S. Cl. ................................................. 188/319
[58] Field of Search .............. 188/282, 289, 317, 319, 188/322; 11/11

[56] References Cited

U.S. PATENT DOCUMENTS

| | | | |
|---|---|---|---|
| 967,285 | 8/1910 | Wilson | 188/319 |
| 2,148,891 | 2/1939 | Applegarth | 188/319 |
| 3,827,538 | 8/1974 | Morgan | 188/319 |

FOREIGN PATENT DOCUMENTS

| | | | |
|---|---|---|---|
| 1100323 | 4/1955 | France | 188/319 |
| 326316 | 3/1930 | United Kingdom | 188/319 |

Primary Examiner—Duane A. Reger
Attorney, Agent, or Firm—James B. Raden; William J. Michals

[57] ABSTRACT

A hydraulic telescopic shock absorber filled with a damping medium in which a piston and a piston rod are reciprocatingly arranged. The piston head which divides the cylinder into two portions is provided with a plurality of longitudinally extending and circumferentially spaced passages extending therethrough. The passage openings on the lower surface of the piston head are closed by a ring-shaped resilient valve. A rigid pie-shaped closing member is coaxially and movably mounted about the piston rod on the upper surface of the piston head. The closing member includes a longitudinally extending adjustment tab which engages an adjustment pin which is fixedly mounted to the lower surface of the cylinder cap. The passages are selectively opened or closed by extending the piston rod until the pin engages the tab and thereafter rotating the piston rod to expose the desired number of passages.

1 Claim, 3 Drawing Figures

ARRANGEMENT FOR ADJUSTING THE DAMPING FORCE OF A SHOCK ABSORBER

The invention relates to an arrangement for adjusting the damping force of a hydraulic telescopic shock absorber having a system of passages for the damping medium which is closed in the rest position of the shock absorber by means of a spring loaded valve and in which an adjusting member is provided, acting upon the passage system so as to control the damping force of the shock absorber.

Such arrangement is known from Dutch Patent No. 85 643. In this prior art arrangement the damping force is adjusted by varying the tension of the valve spring by means of the adjusting member which to this end acts upon the valve spring. This way of adjusting the damping force has the drawback that a substantially constant variation of the damping force is provided, in other words that the damping force/speed curves remain substantially in parallel at various adjusting positions.

It is therefore an object of the present invention to provide an adjusting device for which the damping force variation always remains substantially proportional to the piston speeds, however that the proportionallity factor at the successive adjusting steps gradually increases.

The arrangement according to the present invention is characterized in that the passages closed by the valve each debouch separately on the valve and moreover possess separate inlets which can be closed successively by the adjusting member.

It has been shown that by this measure the increase of the damping force is greater in proportion as the piston speed increases.

The arrangement according to the present invention will now be explained further with reference to an embodiment shown in the related drawings in which.

Figure 1:
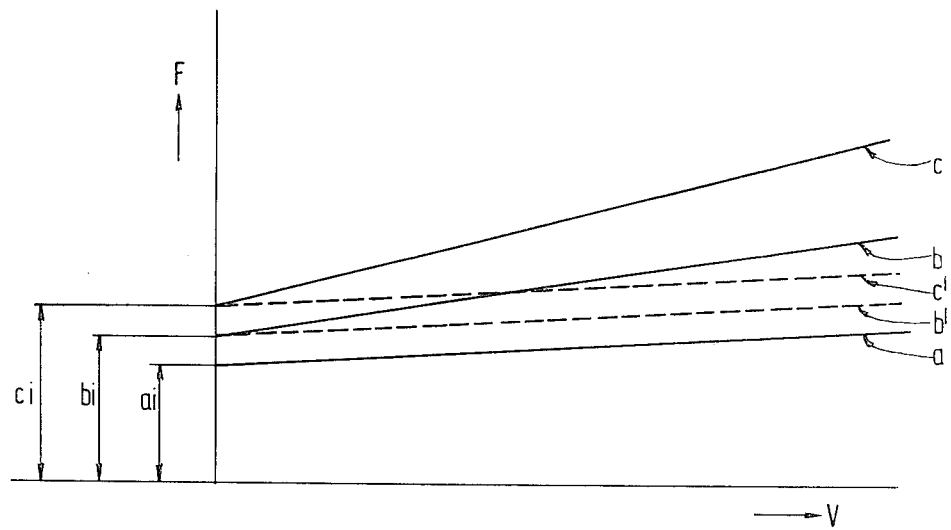
FIG. 1 shows a graph of the relation between the damping forces and the piston speed as provided by the arrangement according to the present invention.

Referring to FIG. 1 line 1 shows the relation between the damping force F and the piston speed V in a first adjusting position of the arrangement.

The increase of the damping force is substantially proportional to the increase of the piston speed.

Line b shows the variation in damping force in a second adjusting position in which the initial damping force is raised from $a_i$ to $b_i$ and an increase in piston speed corresponds with a further increase in damping force.

A prior art shock absorber would show a relation according to the dotted line $b^1$, in which the increase of the initial damping force $b_i$-$a_i$ does not increase further at higher piston speeds.

In a next adjusting position, referring to lines c and $c^1$ and the damping force $c_i$, the same applied as in relation with the lines b and $b^1$ and the initial damping force $b_i$. The number of adjusting positions can be arbitrary.

The arrangement according to the present invention provides a more progressive adjustment i.e. a greater increase of the damping force at increasing speeds than the prior art arrangement. It will be appreciated that if a same high damping force at the same high piston speed would be chosen in the prior art arrangement as in the arrangement according to the present invention the damping forces at low piston speeds would raise out of proportion.

Figure 2:
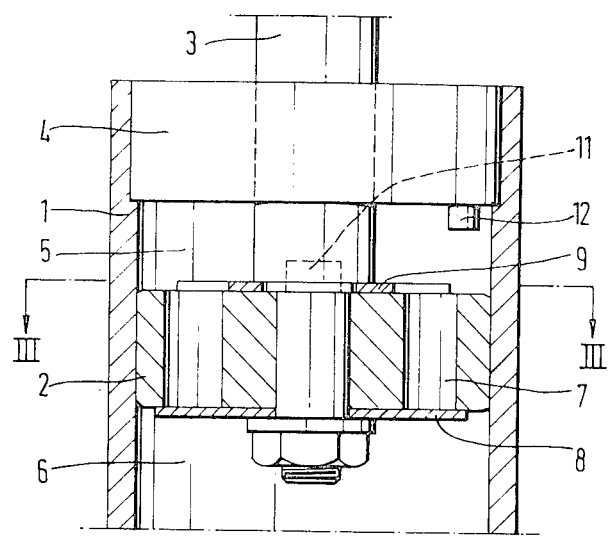
FIG. 2 shows a partial longitudinal sectional view of a hydraulic telescopic shock absorber in which an adjusting device according to the present invention is arranged.
Figure 3:
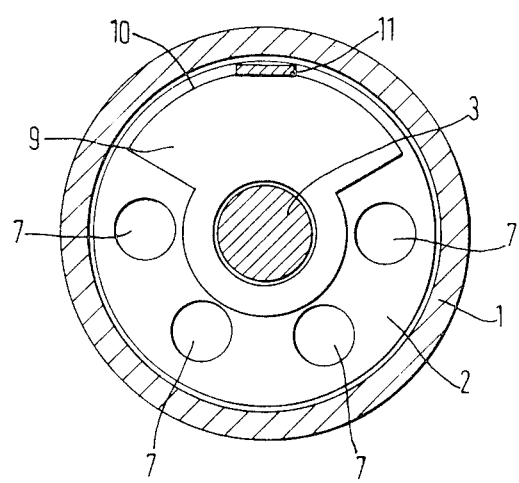
FIG. 3 shows a sectional view along the line III—III in FIG. 2.

In an embodiment of the adjusting arrangement according to the present invention FIGS. 2 and 3 show a cylinder 1 of a hydraulic telescopic shock absorber filled with damping medium in which a piston 2 and a piston rod 3 are reciprocatingly arranged.

The piston rod 3 extends through a cylinder cover 4. The piston 2 divides the cylinder 1 into two rooms 5 and 6 and is provided with passages 7 which can interconnect both rooms and which are closed in the rest position of the shock absorber by a ring-shaped resilient valve 8 on the side of the cylinder room 6.

The inlets of the passages 7 lying at the side of the cylinder room 5 can be covered or not by a closing member 9, which to this end is provided with a portion 10 having an enlarged radius.

The closing member 9 is also provided with an adjusting lip 11, while an adjusting pin 12 is arranged in the cylinder cover 4.

The operation is as follows:

During the outgoing stroke of the piston damping medium is forced out of the cylinder room 5 through passages 7 into cylinder room 6. Hereby the resilient valve 8 will be opened under influence of the pressure of the damping medium at the outlets of said passages 7, the inlets of which are not covered by the closing member 9. The closing of more or less passages 7 can be accomplished by first bringing the piston 2 by means of the piston rod 3 in the end position at the side of the cover and by then rotating the piston rod such that the adjusting lip 11 abuts against adjusting pin 12 preventing the adjusting member 9 from further rotation when the piston rod 3 is additionally rotated so as to have covered a lesser or greater number of passages 7.

I claim:

1. A hydraulic telescopic shock absorber having a cylinder closed by a cylinder cap and filled with a damping medium in which a piston having a piston head and a piston rod is reciprocatingly arranged, said piston head dividing the cylinder into two portions and further provided with a plurality of longitudinally extending and circumferentially spaced passages extending therethrough, the passage openings on the lower surface of the piston head being closed by a ring-shaped resilient valve, a rigid pie-shaped closing member coaxially and movably mounted about the piston rod on the upper surface of the piston head, said closing member including a longitudinally extending adjustment tab which engages an adjustment pin fixedly mounted to the lower surface of said cylinder cap, and wherein said passages are selectively opened or closed by extending the piston rod until said pin engages said tab and thereafter rotating the piston rod to expose the desired number of passages.

* * * * *